May 5, 1959 W. E. BURRELL 2,885,029
MULTIPOINT GREASING SYSTEM
Filed May 28, 1956 3 Sheets-Sheet 1

INVENTOR
William E Burrell
BY
AGENT

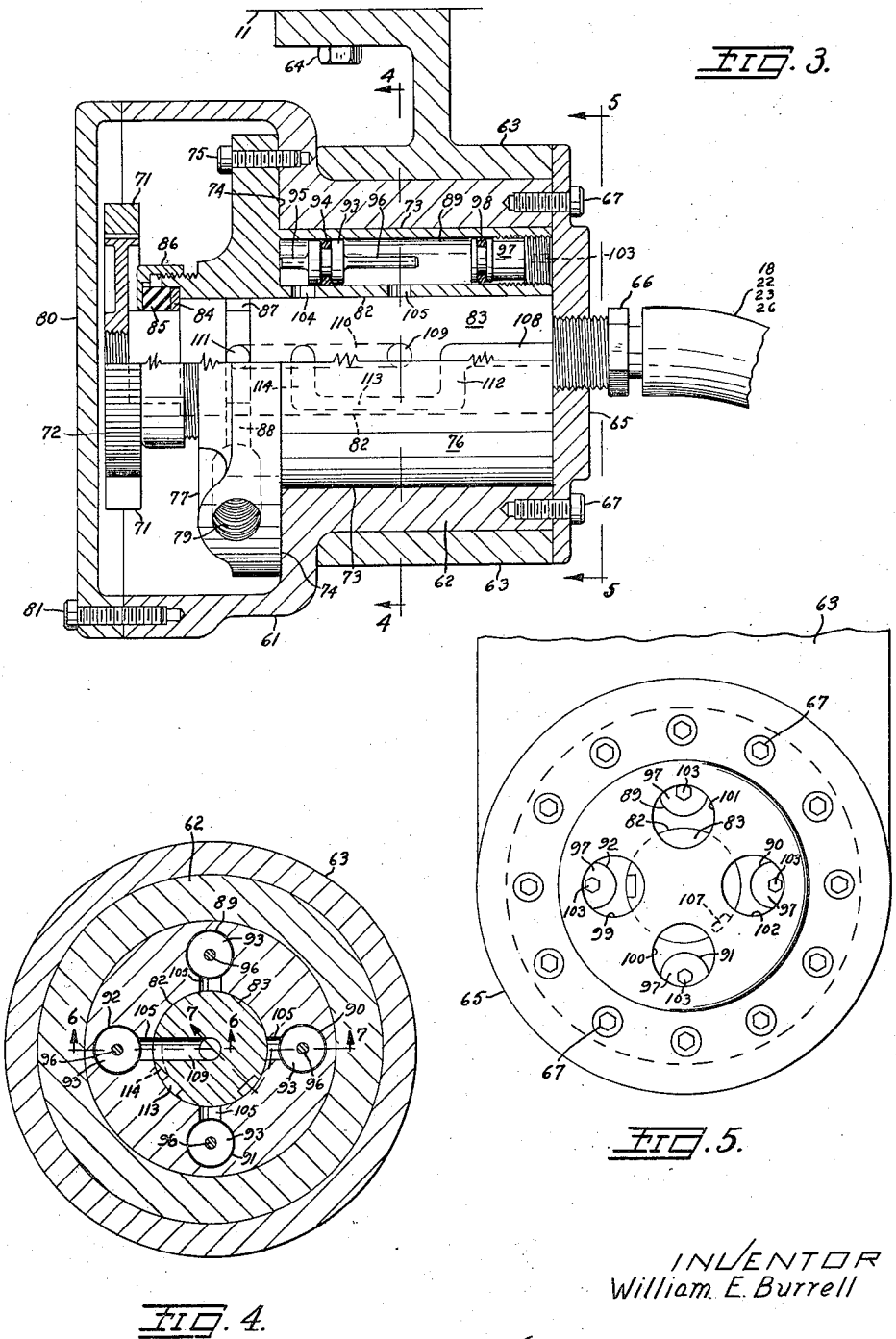

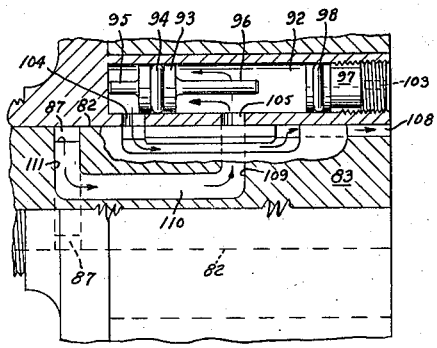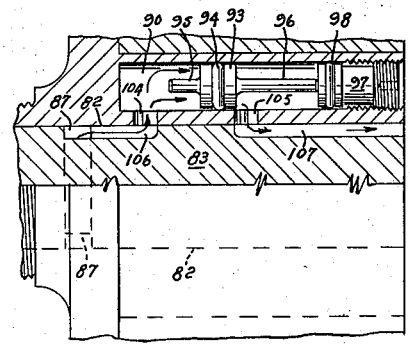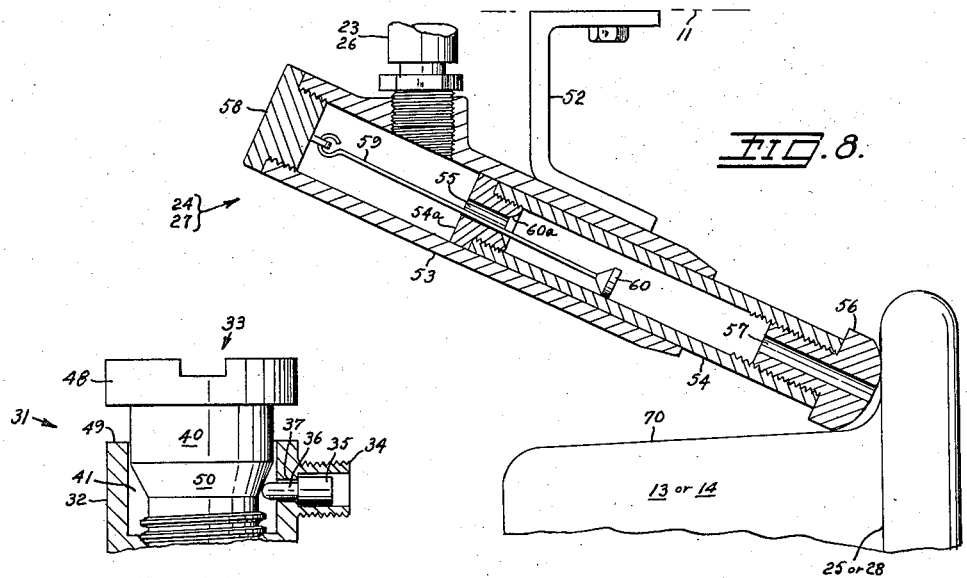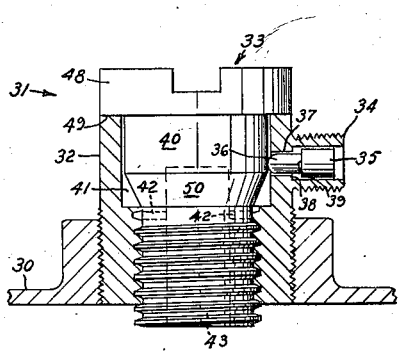

United States Patent Office

2,885,029
Patented May 5, 1959

2,885,029

MULTIPOINT GREASING SYSTEM

William E. Burrell, Portland, Oreg.

Application May 28, 1956, Serial No. 587,677

5 Claims. (Cl. 184—3)

This invention relates generally to methods and means for greasing moving machinery, such as transportation equipment, and more particularly relates to methods and means for the application of grease as required to multiple points of wear of the machinery from a single grease actuating source.

For purposes of illustration of a desirable way in which my invention may be practical, disclosure is here made of the multipoint greasing system of my invention as applied to four major wear points of an electric locomotive. The four operations selected to illustrate the novelty and utility of my invention are the application of grease to the flange of a supporting wheel on one side of a locomotive, the application of grease to the flange of a supporting wheel on the other side of the locomotive, the application of grease to the center plate of the locomotive and the application of grease to the current collecting shoe of the overhead pantograph structure. The present invention provides means for applying grease in the required amounts to all four of these points from a single source by a single actuating mechanism.

As shown in my prior U. S. Patents No. 2,441,685, No. 2,626,680 and my prior U. S. Patent No. 2,797,770 of which this application is a continuation in part it has previously been necessary to supply a complete greasing system to grease properly a single wheel flange.

It is the principal object of this invention to provide a single grease source with a single mechanism adapted automatically to supply as required at multiple points of a mechanical system the grease needed to prevent wear at each of said points.

It is a second object to provide such a mechanism with means for adjusting the amount of grease supplied to each of the wear points in proportion to the severity of the service at the particular wear point.

It is a third object to provide such a mechanism with means for varying the rate of grease supplied to the wear points in proportion to the speed of operation of the mechanical system to which my greasing system is applied.

It is a fourth object to provide such a mechanism with simple and safe means for replenishing the grease supply of the system.

It is a fifth object to provide such a mechanism with grease applicators each adapted to the use of the particular wear point to which the grease is applied by the applicator.

How these and other objects are attained is explained in the following description referring to the attached drawings in which Fig. 1 is a schematic showing of my system as practiced with the electric locomotive referred to above.

Fig. 3 is a view along the line 3—3 of Fig. 2.

Fig. 4 is a view along the line 4—4 of Fig. 3.

Fig. 5 is a view along the line 5—5 of Fig. 3.

Fig. 6 is a fragmental sectional view along the line 6—6 of Fig. 4.

Fig. 7 is a fragmental sectional view along the line 7—7 of Fig. 4.

Fig. 8 is an elevation in partial section of the means for applying grease to a locomotive wheel flange.

Fig. 9 is an elevation in partial section of the air cut off and grease filling opening of the grease storage tank of this invention.

Fig. 10 is a fragmentary view similar to Fig. 9 but in another operative condition.

Like reference numerals refer to like parts in the several figures of the drawings.

Figures 1, 2:
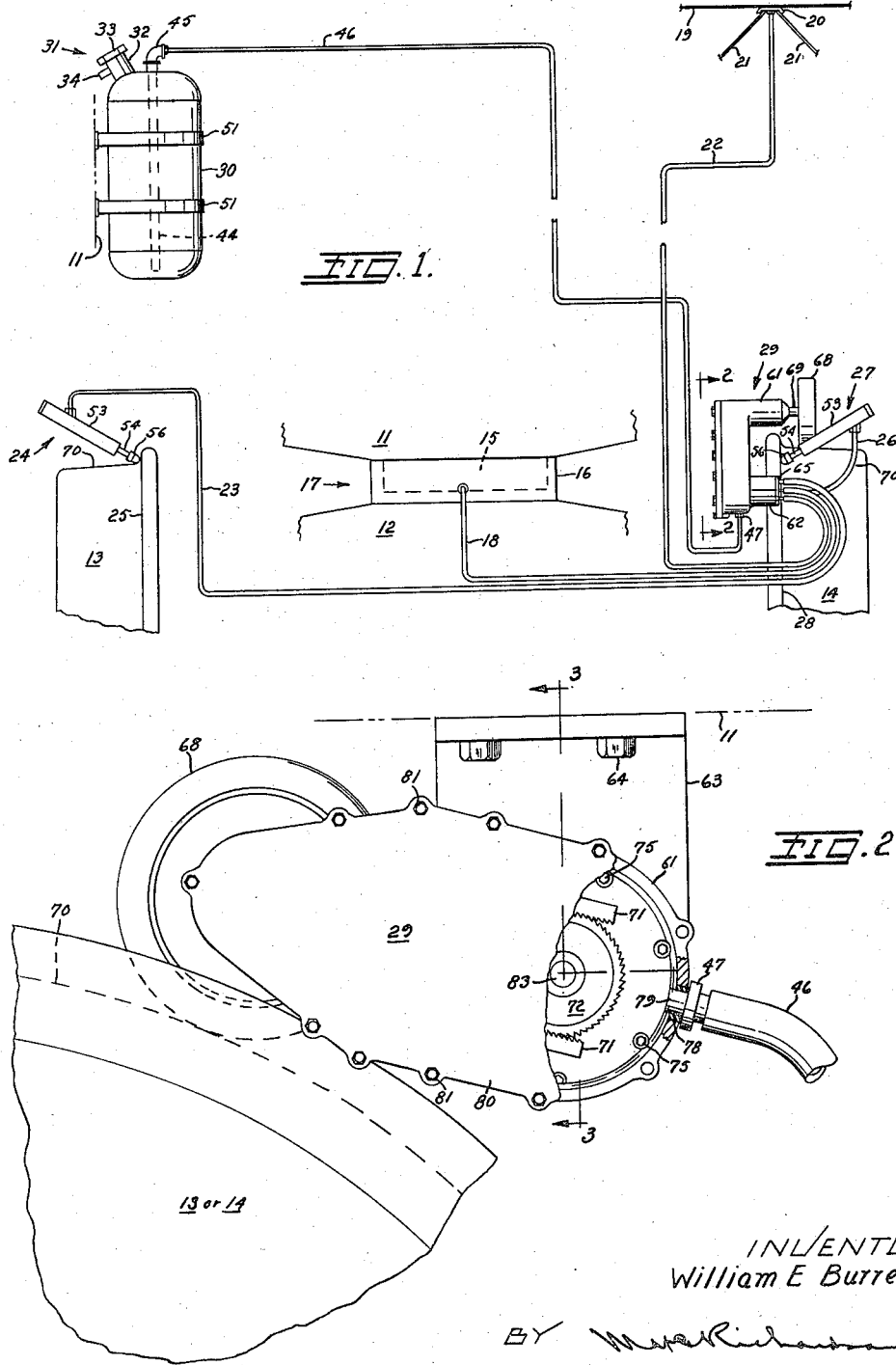
Fig. 2 is a view along the line 2—2 of Fig. 1.

Referring now to the drawings there is shown in scheme only the forward main frame part 11 of a locomotive with the weight of the frame 11 carried on a wheel truck 12 supported on flanged wheels 13 and 14. A piston 15 of large diameter and short length resting in an open upward cylinder 16 of large diameter and short length together form a center plate 17 forming the means for articulation of the frame 11 and truck 12 about a vertical axis. The center plate must be provided with grease at all times, this previously having been a laborious job of manually supplying grease as required. In the present system grease is automatically supplied to center plate 17 through grease pipe 18.

The electric locomotive of which essential parts are shown schematically in Fig. 1 is powered by electric energy collected from a bare overhead trolley wire 19 by a pantograph shoe arrangement 20 supported on the top of the locomotive by spring loaded pantograph arms 21. The construction of current collecting mechanism of the electric locomotive is no part of this invention and is too well known in the art to need description here. But it should be noted that transversely of the rails and at the top of the pantograph are set a pair of forwardly spaced copper or bronze current collecting straps or shoes carried on the top transverse bar of the pantograph which is panned to carry grease to lubricate the shoes as they scrape along the trolley wire. Previously the transversely extending pan carrying the current collecting shoes was periodically manually filled with grease but in the present system the pan is auotmatically kept supplied with just the right amount of grease through pipe 22.

Wherever solid steel flanged wheels are run on steel rails there is lateral rubbing and grinding of the wheel flanges on the rails and continuously grease must be supplied to a forward wheel flange on each side of the train in order that the wheel flange will apply grease to the rail side to prevent wear of the rail and the following wheels. In Fig. 1 it is seen that pipe 23 supplies grease through applicator 24 to flange 25 of wheel 13 and that pipe 26 supplies grease through applicator 27 to flange 28 of wheel 14.

In the disclosure shown it is seen that the grease actuator 29 of this invention is built to supply grease to four separate grease requiring points on the locomotive. However it will be made clear that the number of stations for which the device is built is a matter of choice.

Grease to be supplied as required to actuator 29 is loaded into heavy steel pressure tank 30 through filling device 31 having a body 32, see Figs. 1, 10 and 11, secured to tank 30 and a threaded plug cap 33. Body 32 is formed with a laterally opening collar 34 externally threaded to receive an attachment coupling of a pipe or hose leading from a source of compressed air on the locomotive. Within collar 34 is an air piston 35 with a grinding stem 36 extending through air port 37 in body 32. Flat surface 38 around the entrance to air port 37 forms a seat for the valve seat formed by the flat surface 39 of piston 35 as shown in Fig. 9. Since piston 35 does not fit closely the cylindrical inner surface of collar 34, if piston 35 is prevented from moving towards body 32 by stem 36 striking the cylindrical surface 40 of plug cap 33, air under pressure from an outside source, not shown, through an attachment hose or pipe, not shown, but connected to collar 34, will flow through collar 34 and port 37 to the interior 41 of body 32 and then through radial holes 42 in plug 33 and the bored interior 43 of plug 33 to the interior of grease storage tank 30 to put pressure on the surface of the grease stored therein to urge the grease under full air pressure to move upwardly through the lower end of central pipe 44 in tank 30 outwardly through fitting 45 to pipe 46 leading to grease entrance 47 of grease actuator 29 all as indicated in Figs. 1 and 9. It is seen in Fig. 9 that the underside of head 48 of plug 33 seated on the top surface 49 of body 32 prevents air leakage from tank 30.

A particular feature of the filing device 31 as shown in Figs. 9 and 10 is that when it is necessary to remove plug 33 from body 32 of filling device 31 to replenish the supply of grease in tank 30, a single opening turn of plug 33 will first release the air pressure from tank 30 through cap joints 48, 49 with a limited escape of air from the air supply around the relatively close clearance between piston 35 and the inside of collar 34 after which as plug cap 33 moves upwardly conical surface 50 will move away from stem 36 and allow piston 35 to move inwardly to shut air valve 38——39. Plug cap 33 is then completely removed, tank 30 is filled with grease as desired, plug cap 33 is again screwed into place to seal the interior of tank 30 from the outer air and air pressure is automatically again applied to the interior of tank 30 by the displacement of stem 36 of piston 35 by surfaces 40 and 50 of cap 33. Tank 30 is secured to locomotive frame 11 by brackets 51.

As previously noted pipes 23 and 26 from grease actuator 29 feed grease applicators 24 and 27 respectively for flanges 25 and 28 of wheels 13 and 14. As shown in Fig. 8, applicators 24 and 27 are secured to brackets like 52 bolted, as shown, to frame 11 while in Fig. 1 it is shown that wheels 13 and 14 on truck 12 are somewhat rotatable about the vertical axis of center plate 17 with respect to frame 11. This has the effect of allowing the wheels lateral motion with respect to applicators 24 and 27 as the locomotive moves along the track. For this reason applicator body 53 of either applicator 24 or 27 to the interior of which grease in measured amounts is supplied under pressure by pipes 23 or 26 is equipped with a tubular piston 54 slidably positioned therein. Piston 54 includes threaded cap 54a with a grease port 55 therethrough at its interior end and a ball headed cap 56 with a grease port 57 therethrough threaded into its exterior end. The other end of body 53 of applicator 24 or 27 is closed with a blank threaded cap 58 to the inner end of which is hung a wire 59 extending through port 55 and finished with an end 60 larger than port 55 to limit the outer movement and possible loss of piston 54.

End 60 attached to wire 59 is formed as a conical valve to close on conical valve seat 60a formed around the grease outlet end of port 55. Wire 59 and end valve 60 therefore operate to limit the extension of piston 54 and at the same time shut off the discharge of grease therefrom.

It will be noted that in operation as repeated small shots of grease are urged into the interior of applicator body 51 by actuator 29 the space interior of body 53 and piston 54 will first be at least partially filled and the pressure required to put grease through ports 55 and 57 will cause piston 54 to move outwardly until round head 56 strikes the wheel flange. Then as additional grease is forced into body 53 an equivalent amount will be forced out of port 57 onto the wheel flange. Ball head 56 can not wear on this wheel flange for its contact therewith is always a cause of grease application. In the side to side movement of the truck 12 and wheels 13, 14 it should be noted that the wheel flange may repeatedly jamb against the end 56 of this applicator and as quickly move away therefrom but the ball end 56 of piston 54 is continually reaching out for the wheel flange, extending its reach and storing grease in the interior of the applicator as the flange moves away from the applicator and the applicator acting as a piston pump to pump grease to the flange when the flange crowds the ball end 56 of applicator piston 54.

Both the filling device 31 and the grease applicators 24, 27 are new and essentially useful parts in the economically safe and cleanly operation of my system.

Having explained how the grease used in my system is stored and typically applied to four typical points of need there remains to be examined the new and useful grease actuator 29 which forms the heart of the system since actuator 29 receives grease under air pressure through pipe 46 from tank 30 and delivers grease in regularly required amounts through pipes 18, 22, 23 and 26 respectively to center plate 17, the pan of the pantograph shoe arrangement 20 and the wheel flanges 25 and 28.

Grease actuator 29 is seen in Fig. 3 to have formed on its case 61 a journal part 62 rotatably received in bearing bracket 63 secured to locomotive frame 11 by screws 64. Hose plate 65 into which grease pipes 18, 22, 23 and 26 are engaged by fittings like 66 is secured to case 61 by screws 67 and has the additional duty of securing case 61 in operative position with respect to bracket 63.

Hard rubber tired wheel 68 fixed on shaft 69 journalled in case 61 rests on the tire face 70 of wheel 14 towards which it is biased by the unbalanced weight of actuator 29 partially carried on bracket 63. Rotating with wheel 14 shaft 69 is operatively connected with ratchet wheel 72 through transmission means including ratchet pawls 71 and means for varying the throw of pawls 71 to drive ratchet wheel 72 in one direction only regardless of the direction wheel 14 is going and to drive ratchet wheel 72 at any selected speed ratio with respect to wheel 14. For a typical example of this type of transmission mechanism see my Patent No. 2,797,770 above noted.

Secured to case 61 along interior cylindrical surface 73 and interior flat surface 74 by screws 75 is metering cylinder barrel 76 having an enlarged inlet manifold head 77 into which through bushing 78 in case 61 terminal fitting 47 of grease tube 46 is threadedly engaged at grease entrance hole 79. The open side of case 61 is covered by cover plate 80 secured thereto by screws 81.

As seen in Figs. 3 to 7 barrel 76 is centrally bored through at 82 rotatably to receive cylindrical valve body 83 on to which ratchet wheel is threadedly secured as shown in Fig. 3. Body 83 is secured in longitudinal position by hose plate 65 at one end and retaining parts 84, 85 and retaining nut 86 threadedly engaged with manifold head 77 at the other. Valve body 83 is formed with an annular groove 87 sunk in its outer cylindrical surface in line with grease entrance hole 79 in manifold head 77 to which groove 87 is connected by extension hole 88. Radially spaced between its outer cylindrical surface 73 and its inner cylindrical surface 82, barrel 77 is formed with four similar circumferentially spaced cylinder holes 89, 90, 91 and 92, each extending from a blind end under head 77 to an open end at the inner face of hose plate 65 and each adapted to receive a similar piston 93 sealed to the cylinder wall by an O ring 94 and each having a short end extension 95 and a long end extension 96. The open ends of cylinder holes 89 to 92 are each internally longitudinally threadedly engaged by adjustably positionable piston throw limiting cylinder heads 97 sealed to the cylinder wall by an O ring 98. As shown in Figs. 3 and 5 when the fittings 66 of the four grease tubes 18, 22, 23 and 26 are removed from holes 99, 100, 101 and 102 the ends of cylinder heads 97 are seen to have hexagonal holes 103 sunk therein to receive a hexagonal wrench when it is desired to position the cylinder head 97 to set the desired throw of piston 93.

Radially inwardly from each of the cylinder holes 89 to 92 to the inner cylindrical surface 82 of barrel 76 barrel 76 is formed with a pair of grease ports 104 and 105 spaced longitudinally so that, as shown in Figs. 3, 6 and 7, port 104 will always be to the left of its associated piston 93 and port 105 will always be to the right of its associated piston 93.

Sunk into the surface of cylindrical valve body 83, as particularly shown in Fig. 7, are two aligned longitudinal grooves or grease channels 106 and 107. Grease channel 106 at its inlet end is always connected by annular groove or grease channel 87 and hole 88 with grease entrance 79 and is therefore always filled with grease under pressure. Grease channel 107 at its outlet end is always connected with an appropriate hose connection hole, 99 to 102, when the adjacent ends of channels 106 and 107 are connected to the grease ports 104 and 105. Thus at every consecutive ninety degrees of rotation of ratchet wheel 72 and valve body 83, grease under pressure from channel 106 enters the respective port 104 of one of the cylinders 89, 92, 91, 90 and pushes its piston 93 to the right pushing grease from the space in the cylinder at the right of piston 93 out through its port 105 through channel 107 to the appropriate hose connection hole 102.

Spaced circumferentially in valve body 83, 135 degrees from grooves 106 and 107 are grease groove 108 and radial hole 109. Radial hole 109 is in the radial plane of ports 105 which it periodically connects as seen in Figs. 3 and 6, with grease supply groove 87 through axial hole 110 and radial hole 111 in valve body 83. Grease groove 108 is connected by circumferential groove 112 and longitudinal groove 113 with circumferential groove 114 in the radial plane of ports 104. The free end of groove 114 is aligned with groove 108 and groove 113 is offset 45 degrees therefrom. It is thus seen that at the 45 degree positions between the 90 degree positions at which grease channels 106 and 107 are utilized to feed grease to the left sides of pistons 93 to move pistons 93 one at a time to the right to feed grease to their appropriate grease tubes holes 109, 110, 111 and grooves 108, 112, 113, 114 are used to feed grease consecutively from groove 87 to the right sides of pistons 93 to push pistons 93 to the left to push the grease from the left side of pistons 93 to their appropriate grease tubes.

In placing my greasing system in operation the cam mechanism (shown in my Patent No. 2,797,770 above noted) which governs the throw of pawls 71, which drive ratchet wheel 72, is set at its calibration indication to cause the grease actuator mechanism to feed to each point of need at least the desired amount of grease per mile of locomotive operation when pistons 93 are allowed their greatest travel. Then cylinder heads 97 are each individually positioned to limit the throw of the piston 93 in the particular cylinder 89, 90, 91 or 92 to the amount necessary to supply the grease needed at the appropriate grease point.

Then with the system assembled as above explained and the locomotive in motion ratchet wheel 72 turns valve body 83 counterclockwise as viewed in Figs. 4 and 5. Spaced at ninety degree intervals of rotation of body 83 the ports 104 and 105 of cylinders 89, 92, 91 and 90 are consecutively mated to grease channels 106 and 107 respectively and the respective pistons 93 are moved to the right as shown in Fig. 7, to feed grease to the respective grease connections 101, 99, 100 and 102 of grease tubes 23, 18, 22 and 26. At the intervening forty five degree positions of valve body 83 the ports 104 and 105 of cylinders 90, 89, 92 and 91 are consecutively mated respectively to grease channel 108 through channels 112, 113 and 114 and to groove 87 through holes 109, 110 and 111 so that the respective pistons 93 are moved consecutively to the left, as shown in Fig. 6, to feed grease to the respective grease connections 102, 101, 99 and 100 of grease tubes 26, 23, 18 and 22.

The particular order of piston operation is a matter of choice in design so long as each piston is given a complete cycle of operation for each revolution of valve barrel 83.

Also the disclosure for the purpose shown illustrates and describes a grease actuator 29 adapted for use in supplying grease at an individually adjusted rate to each of four ponts of need. However in my system the number of grease points which can be individually provided for is a matter of choice. By ordinary changes in design dimensions my actuator can be built for any reasonable number of individual grease supplies to fit the needs of a particular job.

Having recited the purpose to which my invention is to be applied, illustrated and described a preferred form in which the several parts and the complete whole of my invention may be practiced and explained the operation thereof, I claim:

1. A lubricating system for applying a heavy viscous grease to a plurality of grease needing points of a machine at a rate responsive to the rate of motion of a part of said machine, said machine including a source of air under pressure and said lubricating system comprising: a source of grease under pressure from said air; a cylinder barrel supported on said machine; said cylinder barrel being formed with a cylindrical bearing bore therein and a plurality of circumferentially spaced cylinder bores formed therein axially parallel to said bearing bore and radially spaced therefrom; a plurality of pairs of cylinder ports formed in said barrel to connect the respective opposite end spaces of said cylinder bore with said bearing bore; a plurality of pistons in said respective cylinder bores separating said opposite end spaces thereof; individual means for adjusting the throw of each of said pistons in said cylinder bores; a grease inlet port formed in said barrel from the outside thereof to said bearing bore; a plurality of grease outlet ports formed in said barrel from said bearing bore to the outside thereof; a first grease conduit connecting said source of grease under pressure with said grease inlet port; a plurality of means for applying grease to said respective grease points of said machine; a plurality of second grease conduits connecting said outlet ports with said respective grease applying means; a rotary valve body journalled in said bearing bore; transmission means operationally connecting a moving part of said machine to said valve body to rotate said valve body at a desired ratio of response to the movement of said machine; and a plurality of grease channels formed in said rotary valve body alternately to connect said grease inlet port respectively with each port of each pair of said plurality of pairs of cylinder ports and alternately to connect said two cylinder ports respectively with a respective one of said pair of outlet ports; whereby whenever said valve body is rotated and one end space of one of said cylinder bores on one side of its respective piston is connected with said inlet port through one of said grease channels and one of its respective pair of cylinder ports the other end space of said cylinder on the other side of said piston will be connected with its respective one of said outlet ports through the other of its respective pair of said cylinder ports and another of said grease channels.

2. A multipoint greasing system for applying grease under pressure to a plurality of points on a locomotive at rates individually required at said points, one of said points being a track wheel flange and all of said grease application rates being proportional to the rate of travel of said locomotive: said system comprising a source of grease under pressure, an applicator for applying grease to said track wheel flange, a grease conduit connecting said source with said applicator and a multipoint grease metering device connected into said conduit to receive grease at one inlet opening from said source at the pressure of said source and deliver said received grease divided as desired to a plurality of outlet openings one of which outlet openings is connected by said conduit with said applicator; said applicator comprising a pair of tubes slidingly sealed in telescopic connection at adjacent open ends, the other end of one of said tubes yieldingly resting axially of said tube against said flange and having a grease outlet port formed therethrough, the other of said tubes having an inlet port into which said conduit is sealed, the other of said tubes being supported on the frame of said locomotive, and said tubes including means for limiting the extension thereof and preventing flow of grease therethrough at the limit of extension; and said multipoint grease metering device comprising a cylinder barrel having a central bore and a plurality of cylinders spaced about said bore, said bore communicating with each of said cylinders adjacent the opposite ends thereof, said cylinder barrel having a pair of heads with a single inlet opening in one head, and a plurality of outlet openings, one each for said plurality of cylinders in the other head thereof, a free piston in each cylinder closing off communication between opposite ends thereof, a rotary valve body in said central bore having ports positioned to connect said inlet opening serially to one end of each cylinder and the other end of the same cylinder to a particular one of said outlet openings and alternately to connect said inlet opening serially to the other end of each cylinder and the one end of the same cylinder to said particular one of said outlet openings, means for rotating said valve body at a speed proportional to the speed of the locomotive and means for individually adjusting the throw of each of said pistons in said cylinders to adjust as desired the relative rates at which grease is metered through each of said cylinders, one of said plurality of outlet openings being connected to said applicator through said conduit.

3. A multipoint greasing system for applying grease under pressure to a plurality of points on a locomotive at rates individually required at said points, one of said points being a track wheel flange and all of said grease application rates being proportional to the rate of travel of said locomotive: said system comprising a source of grease under pressure, an applicator for applying grease to said track wheel flange, a grease conduit connecting said source with said applicator and a multipoint grease metering device connected into said conduit to receive grease at one inlet opening from said source at the pressure of said source and deliver said received grease divided as desired to a plurality of outlet openings one of which outlet openings is connected by said conduit with said applicator; said applicator comprising a pair of tubes slidingly sealed in telescopic connection at adjacent open ends, the other end of one of said tubes yieldingly resting axially of said tube against said flange and having a grease outlet port formed therethrough, the other of said tubes being secured to the frame of said locomotive and having an inlet port into which said conduit is sealed, said tubes including means for limiting the extension thereof and preventing flow of grease therethrough at the limit of extension.

4. A multipoint greasing system for applying grease under pressure to a plurality of points on a locomotive at rates individually required at said points, said system comprising a source of grease under pressure, a plurality of grease needing points on said locomotive, all of which points may require grease to be supplied at individually determined rates, all of said rates being proportional to the speed of said locomotive, individual means for applying grease to said points, a multipoint grease metering device connected to said grease source by an individual conduit and connected to said plurality of points by individual conduits, said metering device comprising a cylinder barrel having a central bore and a plurality of cylinders spaced about said bore, said bore communicating with each of said cylinders adjacent the opposite ends thereof, said cylinder barrel having a pair of heads with a single inlet opening in one head and a plurality of outlet openings in the other head thereof, a respective free piston in each cylinder closing off communication between opposite ends thereof, a rotary valve body in said central bore having conduits positioned to connect said inlet opening serially to one end of each cylinder and simultaneously serially connecting the other end of each cylinder to its respective one of said outlet openings and alternately to connect said inlet opening serially to the other end of each cylinder and the one end of the same cylinder to its respective one of said outlet openings, means for rotating said valve body at a speed proportional to the need for grease of all of said points and means for adjusting the throw of each individual one of said pistons to proportion the flow of grease as desired to the respective ones of said outlet openings.

5. For use in a multipoint greasing system for applying grease under pressure to a plurality of points on a locomotive at rates individually required at said points, a single inlet multiple outlet metering transmitter for hydraulic fluid from a source of hydraulic fluid under pressure to a plurality of hydraulic loads any of which may vary in its fluid supply requirement from any other, said transmitter comprising a cylinder barrel having a central bore and a plurality of cylinders spaced about said bore, said bore communicating with each of said cylinders adjacent the opposite ends thereof, said cylinder barrel having a pair of heads with a single inlet opening in one head and a plurality of outlet openings in the other head thereof, a respective free piston in each cylinder closing off communication between opposite ends thereof, means for varying the throw of each piston in its respective cylinder, a rotary valve body in said central bore having conduits positioned to connect each of said cylinders in turn to said inlet opening and its respective one of said outlet openings in a manner alternately first simultaneously to connect one end of said cylinder to said inlet opening and the other end of said cylinder to said respective one of said outlet openings and then simultaneously to connect the other end of said cylinder to said inlet opening and the one end of said cylinder to said respective one of said outlet openings, whereby the rate of flow of hydraulic fluid through all of said outlets will be proportional to the speed of rotation of said valve body and the relative rates of flow of hydraulic fluid through any of said outlets can be adjusted as desired.

References Cited in the file of this patent

UNITED STATES PATENTS

| | | |
|---|---|---|
| 1,205,306 | Wood | Nov. 21, 1916 |
| 1,841,526 | Flanders | Jan. 19, 1932 |
| 1,951,771 | Reswick | Mar. 20, 1934 |
| 2,076,977 | Bush | Apr. 13, 1937 |
| 2,134,697 | Bijur | Nov. 1, 1938 |
| 2,500,119 | Cooper | Mar. 7, 1950 |
| 2,550,840 | Martin | May 1, 1951 |
| 2,626,680 | Burrell | Jan. 27, 1953 |
| 2,648,399 | Kelly | Aug. 11, 1953 |